United States Patent
Ito

(10) Patent No.: US 6,244,848 B1
(45) Date of Patent: Jun. 12, 2001

(54) CONTROLLER FOR ADJUSTING ZERO POINT FOR LOAD CELL IN A MOTOR-DRIVEN INJECTION MOLDING MACHINE

(75) Inventor: Akira Ito, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/335,926

(22) Filed: Jun. 18, 1999

(30) Foreign Application Priority Data

Jun. 18, 1998 (JP) .................................................. 10-171713

(51) Int. Cl.⁷ .................................................. B29C 45/76
(52) U.S. Cl. ............................................. 425/149; 425/150
(58) Field of Search ................................... 425/149, 150, 425/135, 557, 145

(56) References Cited

U.S. PATENT DOCUMENTS

| | | | | |
|---|---|---|---|---|
| 3,860,801 | * | 1/1975 | Hunkar ............................... | 235/151.1 |
| 4,000,402 | * | 12/1976 | Higham .............................. | 235/151.1 |
| 4,849,678 | * | 7/1989 | Kamiguchi et al. ................. | 318/572 |
| 5,540,577 | * | 7/1996 | Ishikawa et al. .................... | 425/150 |
| 5,567,367 | * | 10/1996 | Ito et al. ............................. | 264/40.1 |
| 5,997,780 | * | 12/1999 | Ito et al. ............................. | 264/40.5 |

FOREIGN PATENT DOCUMENTS 9-174626    7/1997   (JP) .

\* cited by examiner

*Primary Examiner*—Harold Pyon
*Assistant Examiner*—Emmanuel Luk
(74) *Attorney, Agent, or Firm*—Arent Fox Kintner Plotkin & Kahn, PLLC

(57) ABSTRACT

A motor-driven injection molding machine includes an injection device driven by a servo motor, and a load cell for detecting a pressure of a molten resin stored in front of a screw. A position detector detects a position of a screw, and a controller controls the servo motor in accordance with detected values obtained by the load cell and the position detector. The controller controls, in response to a command to adjust a zero point for the load cell, the servo motor to advance and retract the screw in an advancing movement and a retracting movement a plurality of times in a back and forth movement, and calculates an average value of a corresponding plurality of detected values obtained by the load cell during the back and forth movement of the screw to adjust the zero point for the load cell.

5 Claims, 2 Drawing Sheets

1ST CYCLE

2ND CYCLE

3RD CYCLE

CONTROLLER FOR ADJUSTING ZERO POINT FOR LOAD CELL IN A MOTOR-DRIVEN INJECTION MOLDING MACHINE

BACKGROUND OF THE INVENTION

1. Field of the Invention

The present invention relates to a motor-driven injection molding machine having an injection device driven by a servo motor. More particularly, the present invention relates to a method for adjusting the zero point for a load cell for use in pressure detection which is provided to form a control system for the servo motor.

2. Description of the Related Art

Motor-driven injection molding machines have increasingly been used in recent years in which a servo motor is used as a substitute for a hydraulic actuator. Operation of such injection device using servo motors can be summarized as follows.

A screw is rotated with a servo motor for screw rotation in a plasticization/metering process. The screw is located within a heating cylinder. A resin is fed from a hopper to a rear portion of the screw in the heating cylinder. Rotation of the screw melts and advances the resin and thus a certain metered amount of resin is fed to a nose portion of the heating cylinder. During this time, the screw is driven backward due to a back pressure of the molten resin trapped in the nose portion of the cylinder.

An injection shaft is directly connected to a rear end portion of the screw. The injection shaft is rotatably supported by a pressure plate through a bearing. The injection shaft is driven in the axial direction with a servo motor for injection that is supported on the pressure plate. The pressure plate moves forward and backward along guide bars in response to the operation of the servo motor for injection through a ball screw. The above-mentioned back pressure of the molten resin is detected by using a load cell and is controlled with a control loop.

In a filling process, the pressure plate is advanced by means of driving the servo motor for injection. The nose portion of the screw serves as a piston to fill a mold with the molten resin.

The molten resin fills the space within a mold cavity at the end of the filling process. At this point, the control mode for the advancing motion of the screw is switched from a velocity control mode to a pressure control mode. This switching is referred to as V(velocity)-P(pressure) switching and affects the quality of a resultant molded product.

Following the V-P switching, the resin within the mold cavity is allowed to cool under a predetermined pressure. This process is referred to as a dwelling process. In this dwelling process, the pressure of the resin is controlled in a feedback loop as in the above-mentioned back pressure control.

Then, the injection device returns to the plasticization/metering process set forth above after the completion of the dwelling process. On the other hand, a clamping device performs an eject operation for ejecting a solid product out of the mold in parallel with the plasticization/metering process. The ejection operation involves in opening the mold to remove the solid product from the mold by means of an ejector mechanism, and then closing the mold for the resin filling noted previously.

For the injection molding machines having the load cell, it should be noted that a zero point for the load cell is required to be adjusted upon the start-up of the injection molding machine. The adjustment of the zero point is done, for example, as follows. The screw is advanced once and is retracted once to calculate an average value of detected values obtained by using the load cell during the back and forth movement of the screw. The average value is set as the zero point for the load cell.

However, the method as described above which relies on only a single reciprocation of the screw for the zero point adjustment does not necessarily provide an accurate zero point. One possible reason for this is that a solidified resin may accidentally exist between the screw and the heating cylinder during the single reciprocation movement of the screw, inhibiting the complete movement of the screw. Another reason may be due to foreign material accidentally entrapped in a movable unit or units connected mechanically with the screw. In the cases described above, it is hard to detect the back pressure with the load cell under the influence of the solidified resin or the foreign material. It can easily be expected that such a failure of setting the accurate zero point for any reasons including those described above badly affects the quality of a resultant molded product obtained in a subsequent molding process.

SUMMARY OF THE INVENTION

Therefore, an object of the present invention is to provide a method for adjusting a zero point for a load cell with accuracy.

The present invention is applicable to a motor-driven injection molding machine comprising an injection device driven by a servo motor, a load cell for use in detecting a pressure of a molten resin stored in front of a screw, a position detector for detecting a position of a screw, and a controller for controlling the servo motor in accordance with detected values obtained by the load cell and the position detector.

According to an aspect of the present invention, the controller controls, in response to a command to adjust a zero point for the load cell, the servo motor to advance and retract the screw several times. The controller calculates an average value of several detected values obtained by the load cell during the back and forth movement of the screw, whereby adjusting the zero point for the load cell.

BRIEF DESCRIPTION OF THE DRAWINGS

For a more complete understanding of the present invention, reference should be made to the appended drawings, wherein.

DESCRIPTION OF THE PREFERRED EMBODIMENT

Figure 1:
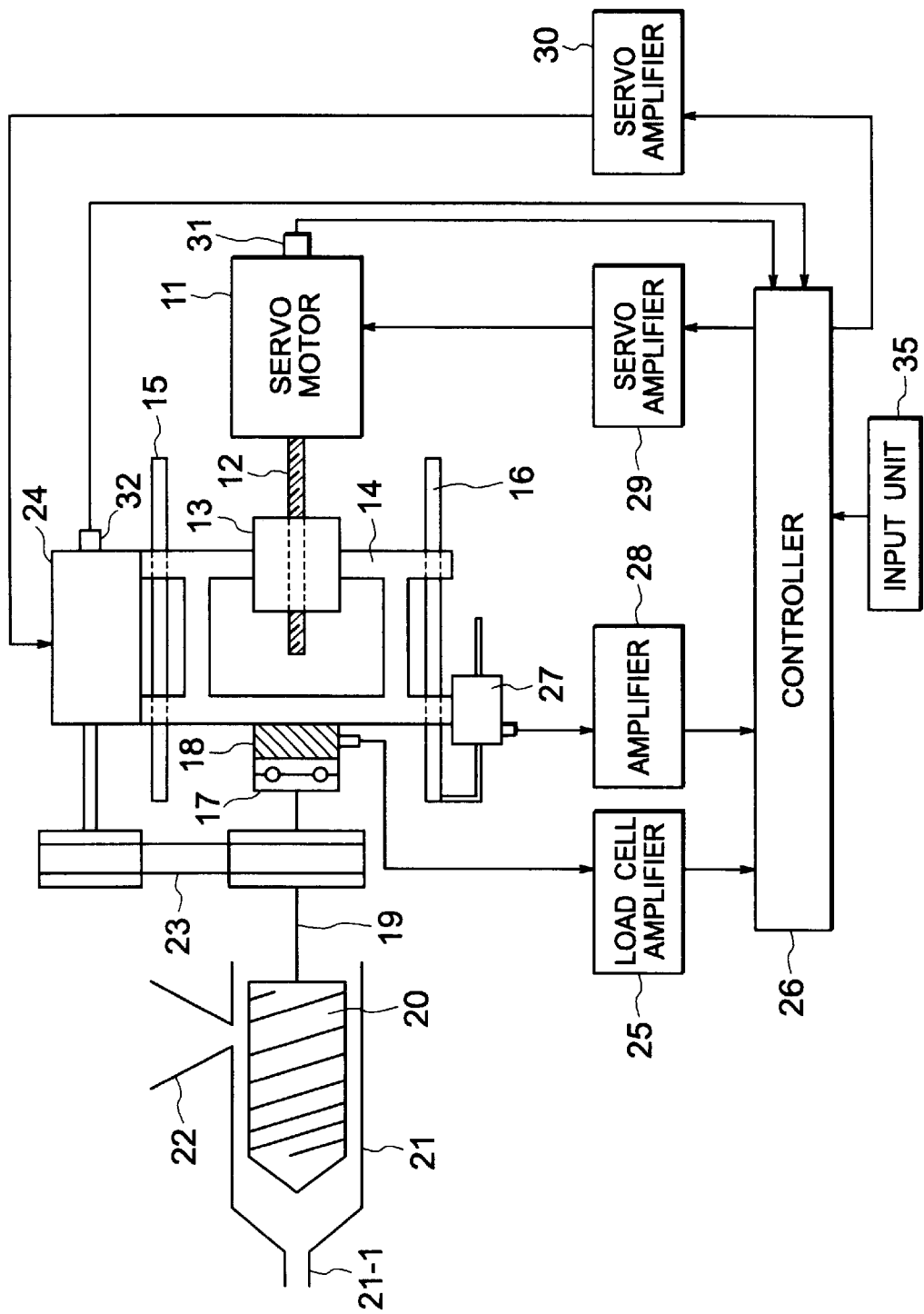
FIG. 1 is a view illustrating a schematic configuration of a motor-driven injection molding machine to which the present invention is applied.

Referring to FIG. 1, a configuration of a motor-driven injection molding machine is described that comprises an injection device operated by servo motors, for the purpose of facilitating the understanding of the present invention. The injection device rotates a screw by means of transmitting a rotation motion of a servo motor into a linear motion through a ball screw and a nut.

In FIG. 1, rotation of an injection servo motor 11 is transmitted to a ball screw 12. A nut 13 is fixed to a pressure plate 14 such that it advances and is retracted in response to the rotation of the ball screw 12. The pressure plate 14 is movable along guide bars 15 and 16 fixed to a base frame (not shown). The back and forth movement of the pressure plate 14 is transmitted to a screw 20 via a bearing 17, a load cell 18, and an injection shaft 19. The screw 20 is positioned within a heating cylinder 21 such that it is rotatable and movable in the axial direction. The heating cylinder 21 corresponding to the rear portion of the screw 20 is provided with a hopper 22 for feeding a resin. The rotation motion of a screw-rotation servo motor 24 is transmitted to the injection shaft 19 via a coupling member 23 comprised of, for example, a belt and a pulley. In other words, the screw 20 rotates as a result of injection shaft 19 being driven by the screw-rotation servo motor 24.

In a plasticization/metering process, a molten resin is stored in the heating cylinder 21 at the head of the screw 20, that is, on the side of a nozzle 21-1 when the screw 20 goes backward while rotating in the heating cylinder 21. The molten resin in front of the screw 20 is then filled in a mold and pressurized for molding by advancing the screw 20 in the heating cylinder. A force acting upon the resin is detected by the load cell 18 as a reaction force, namely, a pressure. The detected pressure is amplified by a load cell amplifier 25 and is then supplied to a controller 26.

A position detector 27 is attached to the pressure plate 14 for detecting movements of the screw 20. A detection signal from the position detector 27 is amplified by an amplifier 28 and is then supplied to the controller 26. The controller 26 supplies a current (torque) command to servo amplifiers 29 and 30 depending on the above-mentioned processes for each of the values set by an operator. The servo amplifier 29 controls an output torque of the injection servo motor 11 by means of controlling a driving current for the injection servo motor 11. The servo amplifier 30 controls a rotation speed of the screw-rotation servo motor 24 by means of controlling a driving current for the screw-rotation servo motor 24. The injection servo motor 11 and the screw-rotation servo motor 24 are provided with encoders 31 and 32, respectively, for detecting a rotation speed. The rotation speed detected by the encoders 31 and 32 are supplied to the controller 26.

It is noted that the configuration illustrated in FIG. 1 is for the sake of simplicity and convenience. A specific configuration of the injection device is described in, for example, Japanese Patent Laid-Open No. 9-174626.

Next, a method for adjusting the zero point for the load cell according to a preferred embodiment of the invention is described. The present invention is applied to most of the motor-driven injection molding machines having an injection device driven by servo motors and having a load cell for pressure detection as a part of a control system for the servo motors. Thus, the following description is for the case where the present invention is applied to the motor-driven injection molding machine illustrated in FIG. 1.

In order to adjust the zero point, an operator enters a command to adjust the zero point for the load cell 18 into the controller 26 through an input unit 35 such as a keyboard. The controller 26 controls, in response to the command to adjust the zero point, the injection servo motor 11 to advance and retract the screw 20 several times. The controller 26 then calculates an average value of several detected values obtained by the load cell 18 during the back and forth movement of the screw and adjusts the zero point for the load cell 18. The above-mentioned reciprocation is previously determined such that the advancing movement follows the retracting movement. Furthermore, movements (typically in millimeter) of the screw 20 are also predetermined such that the maximum amount is achieved in the first cycle, which is reduced gradually. This setting is made by means of entering the movements of the screw 20 through the input unit 35.

Figure 2:
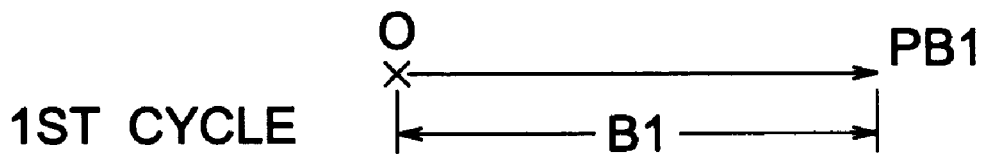
FIG. 2 is a view for use in describing a method for adjusting a zero point for a load cell according to the present invention.
Figure 2:
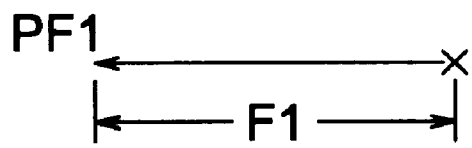
Figure 2:
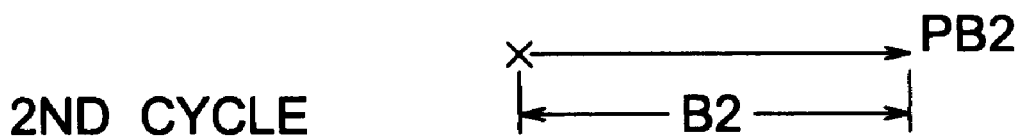
Figure 2:
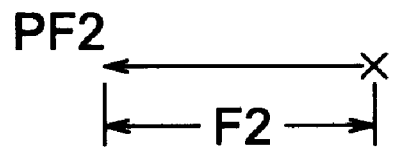
Figure 2:
Figure 2:
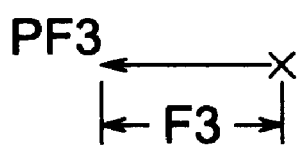

Referring to FIG. 2, description is made for the case where the screw 20 is subject to three cycles of back and forth operations. First retracted and advanced lengths B1 and F1, respectively, of the screw 20 are the maximum amounts for the backward and forward movements, respectively. Second retracted and advanced lengths B2 and F2, respectively, of the screw 20 are less than those in the first cycle. Third retracted and advanced lengths B3 and F3, respectively, of the screw 20 are less than those in the second cycle.

The controller 26 carries out the above-mentioned control to move the screw 20 back and forth while detecting the movements of the screw 20 in accordance with the position detection signals supplied from the position detector 27. More specifically, the controller 26 retracts the screw 20 from a position O by the amount corresponding to the retracted length B1. At that time, the load cell 18 provides a pressure detection value PB1. The controller 26 then advances the screw 20 from the first retracted position by the amount corresponding to the advanced length F1. At that time, the load cell 18 provides a pressure detection value PF1. Likewise, the controller 26 retracts the screw 20 from the first advanced position by the amount corresponding to the retracted length B2. At that time, the load cell 18 provides a pressure detection value PB2. The screw 20 is then advanced from the second retracted position by the amount corresponding to the advanced length F2. At that time, the load cell 18 provides a pressure detection value PF2. Then, the screw 20 is retracted from the second advanced position by the amount corresponding to the retracted length B3 and the load cell 18 provides a pressure detection value PB3. Subsequently, the screw 20 is advanced from the third retracted position by the amount corresponding to the advanced length F3 and the load cell 18 provides a pressure detection value PF3.

The controller 26 carries out the following calculation with the pressure detection values PF1 through PF3 and PB1 through PB3 to provide an average value PM.

$$PM=\{(PB1+PF1)/2+(PB2+PF2)/2+(PB3+PF3)/2\}/3$$

The controller 26 determines the average value PM as the zero point. Strictly speaking, the controller 26 uses the average value PM as an offset value in the subsequent control operations. For example, with a pressure detection value PB obtained during retraction of the screw 20, the controller 26 uses a value (PB−PM) as an actual retracted length.

The above-mentioned cycles of advancement and retraction for the zero point adjustment provide numerous advantages. It is possible that solidified resin may accidentally exist between the screw 20 and the heating cylinder 21 during the first cycle of the back and forth movement of the screw 20. This would, in the prior art, result in inaccurate calculation of the zero point position. However, there is little or no possibility that such an abnormal condition lasts during the subsequent cycles of the back and forth movement of the screw 20. This means that the averaging operation makes the average value closer to the correct zero point even when the first average value has a certain error. The screw 20 can be configured by controller 26 to travel the maximum lengths in the first cycle of the back and forth movement and then shorter lengths in the subsequent cycles. Therefore, the first cycle has the strongest possibility of the abnormal condition. The second and later cycles are much less likely to suffer from such an abnormal condition. The zero point that is closer to the accurate value can thus be obtained through the averaging of the values obtained in the several cycles.

The present invention has been explained in the above embodiment as an example only, and is not intended to limit the scope of the invention in any way. Numerous modifications may be apparent to one of skill in the art, while remaining within the spirit and scope of the invention. To determine the scope of the invention, reference should be made to the appended claims.

What is claimed is:

1. A motor-driven injection molding machine, comprising:

an injection device driven by a servo motor;

a load cell for use in detecting a pressure of a molten resin stored in front of a screw;

a position detector for detecting a position of the screw; and a controller for controlling said servo motor in accordance with detected values obtained by said load cell and said position detector, wherein said controller is configured to control said servo motor, in response to a command to adjust a zero point for said load cell, to move said screw a plurality of back and forth movements such that said screw is moved in a retracting movement and in an advancing movement during each back and forth movement, and calculates an average value of a corresponding plurality of detected values obtained by said load cell during each back and forth movement of said screw to adjust the zero point for said load cell.

2. A machine as recited in claim 1, wherein the controller is configured to control the back and forth movement such that the advancing movement follows the retracting movement.

3. A machine as recited in claim 1, wherein a distance of screw travel during the back and forth movement is such that a maximum distance is achieved in a first movement, and subsequent advancing and retracting movements have distances of screw travel which are less than the maximum distance.

4. A machine as recited in claim 1, wherein a first advancing movement and a first retracting movement are of a first distance, a second advancing movement and a second retracting movement are of a second distance, which is less than the first distance, and wherein a third advancing movement and a third retracting movement are of a third distance, less than the second distance.

5. A machine as recited in claim 4, wherein first, second, and third detected values are obtained during the first, second, and third advancing movements and retracting movements, and wherein the average value is calculated by said controller based upon the first, second, and third detected values.

* * * * *